(No Model.)
E. E. FURNEY.
AIR BLOWER.
No. 422,202. Patented Feb. 25, 1890.
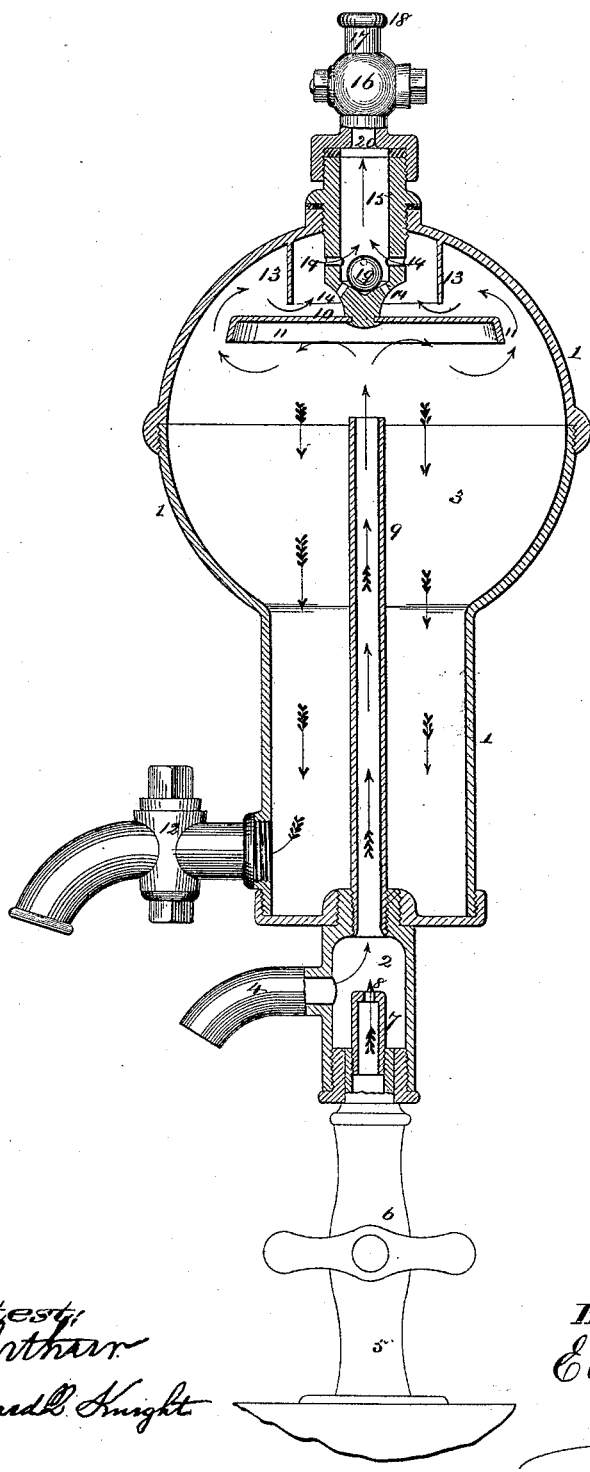
Attest:
E. Arthur
Edward L. Knight
Inventor:
Elliott E. Furney.
By Knight Bros
Attys

UNITED STATES PATENT OFFICE.

ELLIOTT E. FURNEY, OF ST. LOUIS, MISSOURI, ASSIGNOR TO ANDREW LESLIE, OF SAME PLACE.

AIR-BLOWER.

SPECIFICATION forming part of Letters Patent No. 422,202, dated February 25, 1890.

Application filed June 20, 1889. Serial No. 315,000. (No model.)

*To all whom it may concern:*

Be it known that I, ELLIOTT E. FURNEY, of the city of St. Louis, in the State of Missouri, have invented a certain new and useful Improvement in Air-Blowers, of which the following is a full, clear, and exact description, reference being had to the accompanying drawings, forming part of this specification.

This is a device to cause a continuous flow of air under a constant pressure by a stream of water under the same conditions, the water being used as an injector to force the air into a chamber, from which it escapes at the top, while the water flows off from the bottom of the chamber. A ball-valve of less specific gravity than water is arranged to close the eduction air-pipe in case the device becomes filled with water.

The drawing is a vertical axial section of the device, parts being shown in elevation.

1 is the case, whose form is not material.

2 is an air-chamber below the main chamber 3 of the case, and in communication with the outer air by a spout 4.

5 is the water-supply pipe, which may receive water from the city water-supply, or from any source giving the required pressure upon the water.

6 is a cock or valve by which the water-supply may be turned on or off, and which may be used, if desired, to regulate the supply, although it is not intended to be used for the latter purpose.

7 is a nozzle, having a small jet-hole 8, from which a jet of water passes upward through the air-chamber 2 and carries air with it into and through an upright pipe 9 into the chamber 3. The mingled air and water are thrown against a baffle-plate 10, having, preferably, a downturned edge 11. From this point the water descends to the lower part of the chamber and escapes through a regulating-cock 12. It will be seen that the pressure within the chamber 3 will increase with the closing of the cock, so as to cause a stronger current of air. The air passes around the edge of the baffle-plate and impinges against an annular flange 13, depending from the top of the case, which serves to remove from it any fine particles of water which may have escaped from its encounter with the baffle-plate. The air passes through holes 14 into a valve-chamber 15, and from said chamber through the discharge-cock 16 and nozzle 17, which is usually fitted to enter the end of a hose, the bead 18 serving to distend the hose and thus hold it. In the bottom of the valve-chamber rests a ball-valve 19, whose specific gravity is less than water, so that if from any cause the valve-chamber 15 should become filled with water, the valve will float up and close the discharge-passage 20.

The course of the water is indicated by feathered arrows and the course of the air by plain arrows.

In case the water in the chamber 3 should accumulate, so as to be above the top of the pipe 9, it will, if cock 6 is closed, overflow into the pipe and run down into the chamber 2 and out through the pipe 4, which discharges into the same receiver as the cock 12. The cock 12 is usually adjusted so as to give the desired pressure to the air in the chamber 3, and is left in such condition, the valve or cock 6 being the only one which is ordinarily turned, and this may be set wide open and left in this condition as long as the blower is in operation.

I claim as my invention—

1. The combination, with the chamber 2, having an air-induction port, a jet-nozzle projecting into said chamber, and the compression-chamber 3, of the pipe 9, projecting axially with said jet-nozzle from the chamber 2 upward into and a distance above the bottom of the said chamber 3, said chamber 3 having a water-outlet below and an air-outlet above the upper end of pipe 9, and a baffle-plate suspended in said chamber 3 between the said air-outlet and the end of the pipe 9, substantially as set forth.

2. The combination, in an air-blower, of a chamber 2 in communication with the open air, a water-jet passing upwardly through such chamber, an open-topped pipe 9 in line with the water-jet extending from the upper part of the chamber 2 upward through the bottom of and into the compression-chamber 3, forming an overflow-pipe from the compression-chamber, and eduction-passages for water and air below and above the top of pipe 9, respectively, leading from the compression-chamber.

3. The combination, in an air-blower, of a water-supply pipe 5, a stop-cock 6, a jet-nozzle 7, discharging into an air-chamber 2, a spout 4, connecting said air-chamber with the open air, an open-topped pipe 9 in line with the water-jet and extending upward in the compression-chamber 3, said chamber, baffle-plate 10, valve-chamber 15, communicating with the compression-chamber, and the eduction-pipe 20, a valve 19 in the valve-chamber adapted to close the eduction-pipe when the valve-chamber is flooded, and a water-eduction passage in the lower part of the compression-chamber, all substantially as set forth.

ELLIOTT E. FURNEY.

Witnesses:
SAML. KNIGHT,
THOMAS KNIGHT.